Patented Aug. 17, 1948

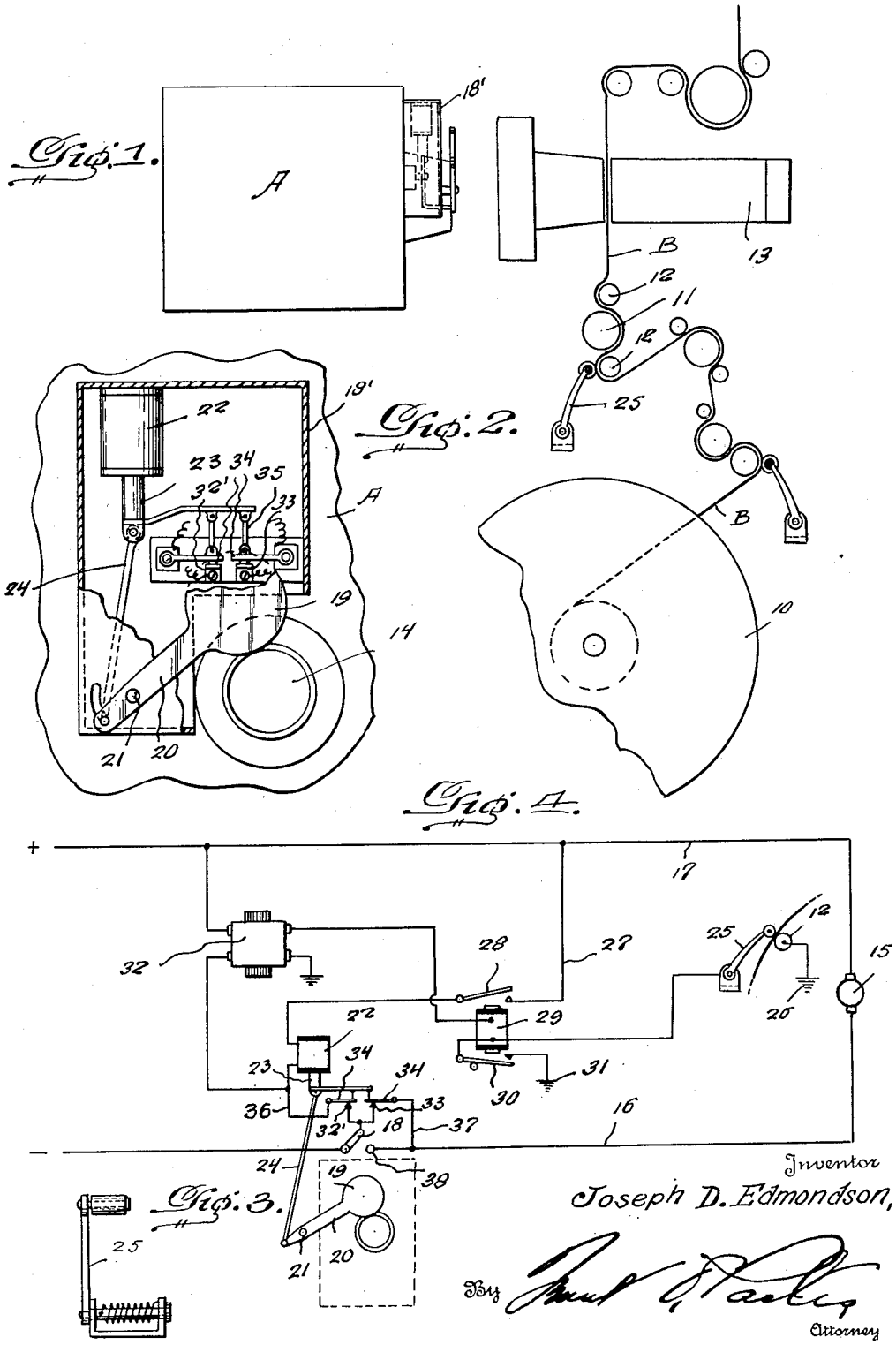

2,447,238

UNITED STATES PATENT OFFICE 2,447,238

ATTACHMENT FOR MOTION-PICTURE PROJECTING MACHINES

Joseph D. Edmondson, Dayton, Tenn., assignor of one-fourth to J. F. Davis, one-fourth to Jess B. Goodrich, and one-fourth to John Ruffner, all of Dayton, Tenn.

Application August 28, 1944, Serial No. 551,524

2 Claims. (Cl. 88—17)

1

The invention relates to an electrically operated fire protection attachment for a moving picture machine, and more especially to a safety device for use with motion picture projecting machines.

The primary object of the invention is the provision of a device of this character, wherein a shutter is automatically controlled for shutting off light through an orifice in the lamp house of motion picture projecting machines, to exclude the said light from the film of the latter, and thereby preventing the said film from catching on fire, should the latter break and interrupt its travel in the machine.

Another object of the invention is the provision of a device of this character, wherein sparking activity at the breaking point of the film will be eliminated, and thereby minimizing the possibilities of conflagration resulting from the inflammable character of the film catching fire from such sparking, the device being automatic in the working thereof, and is electrically controlled for instant operation on the breaking of the film when in motion within the projecting machine.

A further object of the invention is the provision of a device of this character, wherein the installment thereof on a motion picture projecting machine does not require any change or alteration in the latter, and is novel in the construction and arrangement of its parts, it being unique in the working thereof, eliminating fire hazards, and is positive in the operation of the same, with dispatch.

A still further object of the invention is the provision of a device of this character, which is simple in construction, thoroughly reliable and efficient in operation, economical in the working of the same, readily and easily installed in a motion picture projecting machine, durable, requiring little or no attention, it being automatically controlled, and inexpensive to manufacture and install.

With these and other objects in view, the invention consists in the features of construction, combination and arrangement of parts as will be hereinafter more fully described in detail, illustrated in the accompanying drawing, which shows the preferred embodiment of the said invention, and pointed out in the claims hereunto appended.

In the accompanying drawing:

Figure 1 is a side elevation of dislocated portions of a motion picture projecting machine, showing the mechanically working parts of the device constructed in accordance with the invention in association therewith, the parts being in normal condition.

Figure 2 is a fragmentary plan view of the lamp house of the projector machine, showing the light shutter of the device in elevation and in open position, with operating adjuncts allocated therewith, the housing for the adjuncts being partly broken away.

Figure 3 is a detail elevation of one of the film controlled circuit closers of the device.

Figure 4 is a schematic view of the electric circuits of the device.

Similar reference characters indicate corresponding parts throughout the several views in the drawing.

Referring to the drawing, A designates generally the lamp house of a motion picture projector machine, which latter may be of any ordinary well known construction, and B denotes the film having a path of travel from a feeding magazine, not shown, to a take-up reel, a portion thereof being identified at 10, and such film has its path of travel between tracking and guide rollers 11 and 12, respectively, in the usual well known manner past the exposure opening in the exhibitor parts 13 of the projector machine. The source of light for the film B is enclosed by the lamp house A, mounted rearwardly of the parts 13, and the light opening of such house is denoted at 14, through which light is thrown to the exhibitor parts 13 for the projection of the pictures on the film B onto a screen.

The motion picture projector machine, including the feeding mechanism for the film B is as is customary, operated by an electric motor 15 arranged in an alternating current supply line, of 110 volts capacity, having the circuit wires 16 and 17, respectively, and included in this line is an opening and closing switch 18, which is hand operated.

Upon the lamp house A, next to the opening 14, is attached a box-like enclosure body 18', which supports a vertically swingable shutter 19, for closing the said opening 14, and the arm 20 of this shutter is connected by a pivot 21 exteriorly to such body 18' for opening and closing movements. Within the enclosure body 18 is an electric solenoid 22 having its movable armature or core 23 through a pivotal link 24 connected with the arm 20 of the shutter 19, there being a clearance for the connection of the link and arm in the outer wall of the enclosure body 18', as best seen in Figure 2 of the drawing.

Arranged in the path of travel of the film B is one or more circuit closers, the one or each including a pivoted spring actuated contact arm 25 adapted to be insulated by the said film B from a companion contact created by the guide roller 12 next thereto, grounded at 26. The film B normally holds the circuit closer open, until a breakage in the said film occurs, whereby the said closer at the point of breakage closes in the circuit 27 leading to the solenoid 22 which circuit has therein the switch arm 28 of a relay 29, while another switch arm 30 of such relay completes a lock in such circuit to ground 31.

A transformer 32 for stepping down the main supply line voltage from 110 volts to 16 volts is provided across the said supply line, and the primary of this transformer being through the contact 32' and contact 33, respectively, with which are engageable switches 34 pivotally linked at 35 to the armature or core 23 of the solenoid to be controlled thereby, the electrical connection 36 joining the switch arm 34 for the contact 32' with the transformer and solenoid, while the switch 34 for the contact 33 has its electric connection 37 with the line, the contacts 32' and 33 being common to the switch 18 and the flow of the current of the main line supply is controlled accordingly to the positioning of such switch 18 as to the contacts 32' and 33 or the contact 38 in the main supply circuit.

The secondary of the transformer 32 is from ground through relay 29 to normally open the circuit closer including the contact 25, and then to ground leaving the relay normally deenergized.

In the operation of the device, when the switch 18 is on the contacts 32' and 33 common thereto and the film B breaks permitting circuit closer to close the circuit through the secondary of the transformer 32 and relay winding to ground, the relay 29 is energized and draws the switches 28 and 30 to closing positions. This completes a locking circuit for the relay 29 to ground through the circuit closer and obviates possible sparking of the closer on the breaking of the circuit thereto. The engagement of the switch 28 with its front contact completes the circuit to the supply line through the switch 18 and the solenoid 22, which energizes the latter, causing the armature or core 23 thereof to move the arm 20 about its pivot 21 to have the shutter 19 close the opening 14, and at the same time moving the switches 34 off and back from the closing positions. The movement of the switch 34 for the contact 32' opens the circuit through the relay 29 and cuts the power supply off from the solenoid 22. The movement of the switch 34 for the contact 33 opens the circuit to the motor 15 and renders it inoperative, since the power circuit may be traced through the switch 18 and the switch 34 on contact 33 to such motor.

The deenergization of the solenoid 22 will not return its armature or core 23, and in turn the switches 34 for the contacts 32' and 33, and the arm 23 of the shutter 22 to their original position, since the usual biasing spring has been eliminated. When the switch 18 is manually operated to engage the contact 38 the operation is the same, except the system will not render the motor 15 inoperative when the film B breaks, as the switch 33 has been by-passed by this action.

The elimination of sparking at the circuit closer through the use of the relay 29, switch arm 30 and the locking circuit reduces possibility of fire hazard through ignition of the film B resulting from such sparks that would otherwise occur at the circuit closer having the contact 25.

The closing of the shutter 19 shuts off light from the opening 14 on the breaking of the film B, and thereby avoids setting fire to the latter, as the said film will be separated from the action of the light in the projector machine.

What is claimed is:

1. Operating means for a dowser of a motion picture machine including a solenoid for moving the dowser to an operative position, an electric circuit for said solenoid, a spring actuated switch in said circuit normally held in open position by the motion picture film and a double pole relay switch between said spring switch and said solenoid adapted to close the circuit to said solenoid and ground the circuit to said spring switch upon closing of the latter.

2. Operating means for a dowser of a motion picture projecting machine including a solenoid for moving said dowser to an operative position, an electric circuit for said solenoid, a spring actuated switch in said circuit normally held in an open position by the motion picture film, a double pole relay switch interposed in said circuit between said spring switch and said solenoid operable upon closing of said spring switch to close the circuit to said solenoid and ground the circuit to said spring switch, and a switch actuated by said solenoid for opening said circuit upon energizing of said solenoid.

JOSEPH D. EDMONDSON.

REFERENCES CITED

The following references are of record in the file of this patent:

UNITED STATES PATENTS

| Number | Name | Date |
| --- | --- | --- |
| 1,000,154 | Crosier | Aug. 8, 1911 |
| 1,142,103 | Klink | June 8, 1915 |
| 1,261,029 | Hulsey et al. | Apr. 2, 1918 |
| 1,658,594 | Feeney et al. | Feb. 7, 1928 |
| 1,725,574 | Feeney et al. | Aug. 20, 1929 |
| 1,799,154 | Brook | Apr. 7, 1931 |
| 1,804,340 | Hoffman et al. | May 5, 1931 |
| 1,946,875 | Nicholson | Feb. 13, 1934 |

FOREIGN PATENTS

| Number | Country | Date |
| --- | --- | --- |
| 268,611 | Italy | Oct. 23, 1919 |